(12) United States Patent
Kim et al.

(10) Patent No.: US 12,153,448 B2
(45) Date of Patent: Nov. 26, 2024

(54) OBJECT MANIPULATOR AND PAYLOAD MANAGEMENT SYSTEM FOR UNMANNED AERIAL VEHICLES (UAVS)

(71) Applicant: The Board of Regents of the Nevada System of Higher Education on Behalf of the University of Nevada, Las Vegas, NV (US)

(72) Inventors: Dongbin Kim, Las Vegas, NV (US); Paul Y. Oh, Las Vegas, NV (US)

(73) Assignee: The Board of Regents of the Nevada System of Higher Education on Behalf of the University of Nevada, Las Vegas, NV (US)

( * ) Notice: Subject to any disclaimer, the term of this patent is extended or adjusted under 35 U.S.C. 154(b) by 338 days.

(21) Appl. No.: 17/348,453

(22) Filed: Jun. 15, 2021

(65) Prior Publication Data

US 2021/0389783 A1 Dec. 16, 2021

Related U.S. Application Data

(60) Provisional application No. 63/039,226, filed on Jun. 15, 2020.

(51) Int. Cl.
| | | |
|---|---|---|
| *B64U 10/13* | (2023.01) | |
| *B25J 5/00* | (2006.01) | |
| *B25J 9/00* | (2006.01) | |
| *B25J 13/08* | (2006.01) | |
| *B25J 15/00* | (2006.01) | |
| *B64D 1/22* | (2006.01) | |
| *B64U 60/00* | (2023.01) | |
| *G05D 1/00* | (2006.01) | |
| *B64U 101/64* | (2023.01) | |

(52) U.S. Cl.
CPC ............... *G05D 1/106* (2019.05); *B25J 5/00* (2013.01); *B25J 9/003* (2013.01); *B25J 13/081* (2013.01); *B25J 13/089* (2013.01); *B25J 15/0052* (2013.01); *B64D 1/22* (2013.01); *B64U 60/00* (2023.01); *G05D 1/0816* (2013.01); *B64U 2101/64* (2023.01)

(58) Field of Classification Search
CPC ..... G05D 1/106; B25J 13/089; B25J 15/0052; B25J 9/003; B25J 13/081; B25J 5/00; B64C 2201/128; B64C 39/024
See application file for complete search history.

(56) References Cited

U.S. PATENT DOCUMENTS

| | | | |
|---|---|---|---|
| 9,446,858 B2 | 9/2016 | Hess | |
| 11,417,223 B2 * | 8/2022 | Tribou | ................. G08G 5/0013 |
| 11,423,790 B2 * | 8/2022 | Yu | ......................... G05D 1/0866 |

(Continued)

*Primary Examiner* — Dalena Tran
(74) *Attorney, Agent, or Firm* — Ballard Spahr LLP

(57) ABSTRACT

A parallel manipulator with six degrees of freedom may include a base that attaches to a unmanned aerial vehicle and a movable gripper element that may be positioned below the UAV. The positioning of the gripper element my reduce impact of the center of gravity of the attached UAV. The gripper element may include a geometric shape that complements objects routinely used in high-throughput screening (HTS) laboratories, such as microplates. The parallel manipulator and gripper element may be used to quickly, safely, and securely move objects in HTS laboratories and/or the like.

20 Claims, 6 Drawing Sheets

(56) References Cited

U.S. PATENT DOCUMENTS

| | | | | |
|---|---|---|---|---|
| 11,691,761 B2* | 7/2023 | Dolata | ................... | B64D 47/08 |
| | | | | 244/17.23 |
| 11,772,791 B2* | 10/2023 | Broberg | ................ | B64C 39/024 |
| | | | | 361/752 |
| 2020/0148349 A1* | 5/2020 | Bosworth | .............. | B25J 9/1682 |

* cited by examiner

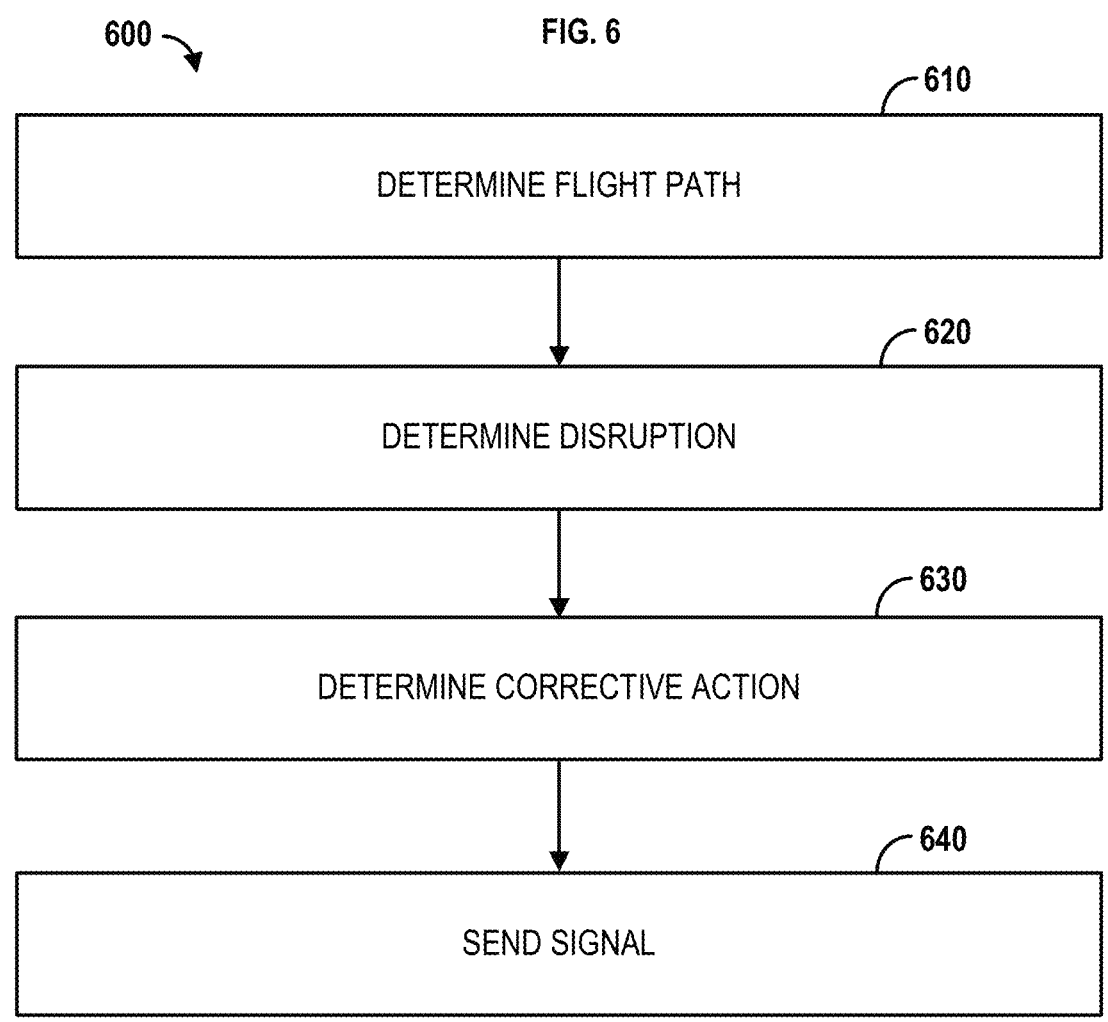

OBJECT MANIPULATOR AND PAYLOAD MANAGEMENT SYSTEM FOR UNMANNED AERIAL VEHICLES (UAVS)

CROSS REFERENCE TO RELATED PATENT APPLICATION

This application claims priority to U.S. Provisional Application No. 63/039,226 filed Jun. 15, 2020, the entirety of which is herein incorporated by reference.

GOVERNMENT LICENSE RIGHTS

This invention was made with government support under grant 00055082, awarded by the National Science Foundation (NSF) and Promoting Research and Innovation in Methodologies for Evaluation (PRIME), and grant 00055082.05A, awarded by Missouri University of Science and Technology (MUST). The government has certain rights in the invention.

BACKGROUND

Unmanned aerial vehicles (UAVs) are routinely employed to perform tasks such as capturing images and/or moving objects. UAVs often include robotic arms and/or manipulators that, due to their design, disrupt and/or disorient the inflight positioning of the UAV to an extent that the UAV may deviate from a flight path. For example, robotic arms often have grippers, booms, cameras, payloads, and/or other components, the weight of which may not be optimally (e.g., evenly) distributed or properly balanced which may cause the deviation. Therefore, when attached to UAVs, robotic arms cause the UAVs to expend additional power and resources generating thrust to correct a flight orientation, path, or pattern that has been disrupted or offset by the robotic arm. As such, manipulator/arm mechanisms, when attached to a UAV, have significant impact on the UAV's stabilization. This is particularly problematic when a payload is fragile or should not be disrupted during flight. There has been no parallel manipulator/arm design that can attach to a UAV with minimal impact on the flight and stabilization requirements of the UAV.

SUMMARY

It is to be understood that both the following general description and the following detailed description are exemplary and explanatory only and are not restrictive. An object manipulator and payload management system for unmanned aerial vehicles (UAVs) is described. A controllable apparatus may be attached a to body of a UAV as a parallel manipulator and gripper (PMG) (e.g., a three-axis PMG), for precise manipulation and handling of objects. The apparatus may include a base member that attaches to the body of a UAV. For example, the base member may be configured to be releasably attached to the body of the UAV. For example, the base member may be secured with one or more screws, one or more adhesives or any other suitable means to fasten the base member to the body of the UAV. A first plurality of rigid members may extend from the base member with each of the rigid members being rotatably and pivotally coupled to the base member. The base member may comprise or otherwise be secured to one or more hinge elements. For example, and depending on the configuration, the base member may comprise and/or be otherwise secured to one or more balls or sockets of one or more ball and socket joints or any other type of joint which may facilitate a rotation and/or pivot. Each rigid member of the first plurality of rigid members may include a plurality of predetermined weight-balance fixation positions and be associated with a repositionable weight. For example, in an embodiment, each predetermined weight-balance fixation position of the plurality of weight-balance fixation positions may comprise a cavity or recess configured to receive or otherwise accommodate one or more repositionable weights. One or more actuators may be used to remove a repositionable weight from and/or secure a repositionable weight of the one or more repositionable weights, at any one of the plurality of predetermined weight-balance fixation positions.

Each rigid member of the first plurality of rigid members may be connected, via a respective hinge element of the one or more hinge elements (e.g., a ball joint, etc.), to a rigid member of a second plurality of rigid members. For example, each rigid member of the second plurality of rigid members may include a proximal end that is rotatably and pivotally coupled to a distal end of a rigid member of the first plurality of rigid members.

The apparatus may include a gripper element that may be used to grasp and/or manipulate a payload (e.g., an object such as a microplate). The apparatus may comprise one or more gripper element sensors. For example, the gripper element may include a plurality of gripper members that are each coupled to one or more actuators for actuating movement of the gripper members. For example, each gripper member of the plurality of gripper members may be coupled to a distal end of a rigid member of the second plurality of rigid members by a joint with an actuator coupled to the joint. The apparatus may comprise a plurality of gripper element sensors. For example, each gripper member of the plurality of gripper members may be associated with one or more gripper element sensors (e.g., a tactile/pressure sensor, a proximity sensor, an imaging sensor, a photoelectric sensor, etc.). A control unit may be communicatively coupled to each actuator and/or sensor of the apparatus. The control unit may include a wireless transceiver for sending and receiving control signals used to manage the operation and control of the sensors and actuators.

The control unit may communicate with a control module of a UAV. The control unit may communicate flight information with the UAV, such as orientation information, weight/payload information, sensor relating information, telemetry data, and/or the like that may be used to set, modify, and/or update a flight plan and/or in-flight operation of the UAV. For example, the control unit may receive flight data/information from a plurality of flight sensors such as an accelerometer and/or gyroscope, including as orientation information, that may be sent to the control module of the UAV to enable flight stabilization and/or weight/load balancing/adjustment. For example, one or more hinge elements may be engaged to change an angle between one or more rigid members of the first plurality of rigid members and the base member and/or one or more rigid members of the second plurality of rigid members. Similarly, an angle between the one or more second rigid members of the second plurality of rigid members and the gripping element may be changed so as to adjusting a center of gravity associated with the UAV and/or a center of mass associated with the UAV. In another example, one or more repositionable weights may be moved (e.g., translated) up or down the length of one or more rigid members of the first plurality of rigid members and/or one or more rigid members of the second plurality of rigid members, thereby adjusting a center of gravity associated with the UAV and/or a center of mass associated with the UAV.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems:

FIG. 6 shows an example method.

DETAILED DESCRIPTION

Figure 1:
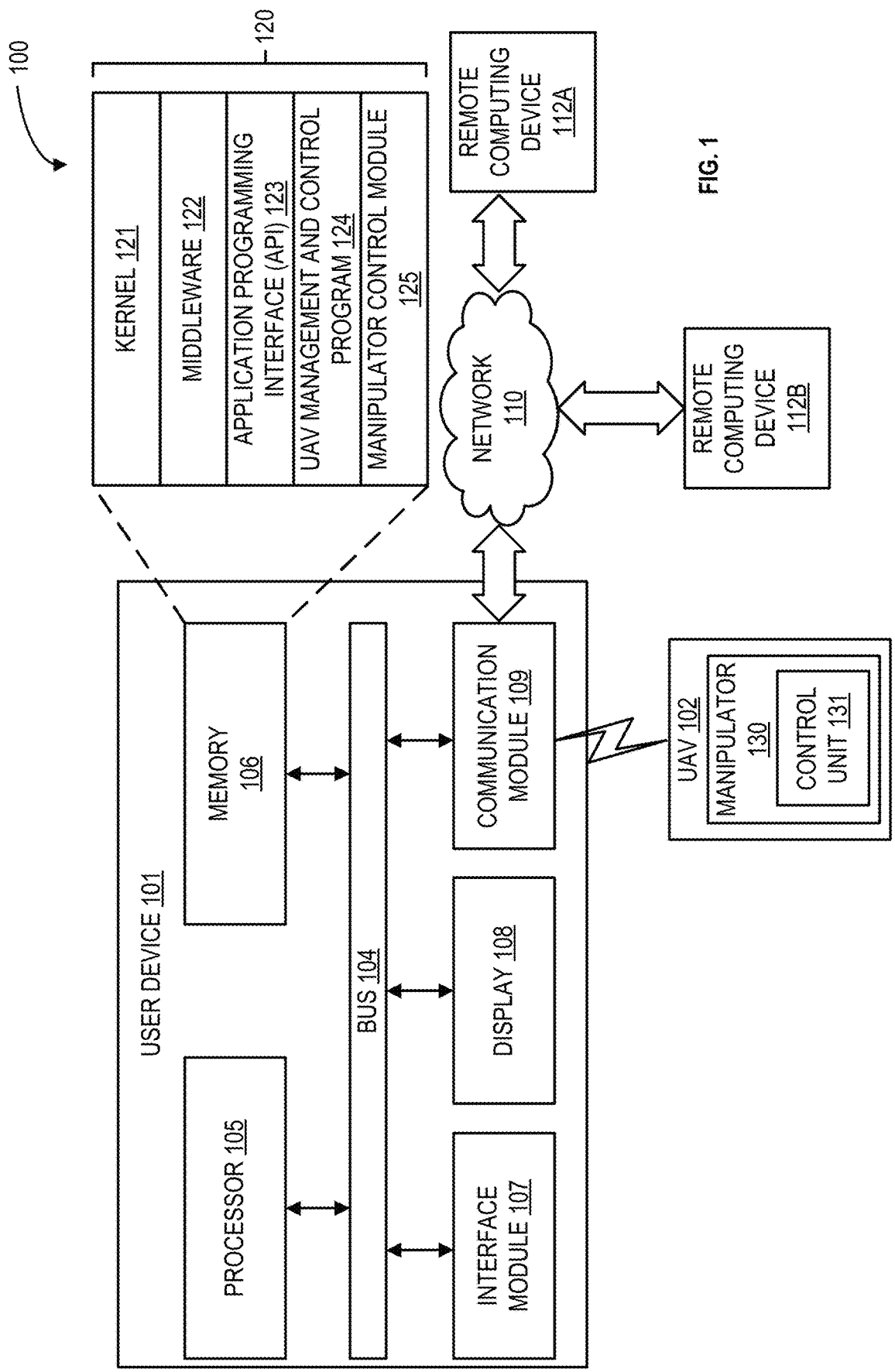
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

This detailed description may use certain terms such as "up," "down," "upper," "lower," "upward," "downward," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this detailed description where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

An object manipulator and payload management system for unmanned aerial vehicles (UAVs) is described. A controllable apparatus may be attached to a body of a UAV as a PMG for precise manipulation, gripping, and handling of a payload. The payload may comprise one or more objects. For example, the payload may comprise a test tube or microplate. A person skilled in the art will appreciate that the aforementioned are merely explanatory and that the payload may comprise any object or number of objects. For example, the apparatus may include a gripper element that is configured to adjust to a size and/or dimension associated with the payload such as a microplate used in a testing/research laboratory such as a high-throughput screening (HTS) laboratory. The gripper element may be configured for grasping of objects, such as microplates and/or the like. For example, the gripper element may comprise the parallel manipulator-gripper.

The apparatus may include a base member that attaches to the body of a UAV. For example, the base member may be configured to be releasably attached to the body of the UAV. For example the base member may be secured with one or more screws, one or more adhesives or any other suitable means to fastening the base member to the body of the UAV. For example, the base member may include a geometry that is compatible with UAVs manufactured by companies such as DJI, Kespry, Parrot, Yuneec, and/or the like. The base member may include any suitable geometry.

The apparatus may comprise a first plurality of rigid members. The first plurality of rigid members (e.g., booms, etc.) may extend from the base member. Each rigid member of the first plurality of rigid members may comprise a distal end and a proximal end. Each rigid member of the first plurality of rigid members may be rotatably and pivotally coupled to the base member, for example, via ball joint and/or the like. For example, a proximal end of each rigid member of the first plurality of rigid members may be rotatably and pivotally coupled to the base member. Each rigid member of the first plurality of rigid members may comprise a plurality of predetermined weight-balance fixation positions. The weight-balance fixation positions may be evenly and/or incrementally spaced along the internal body of each rigid member of the first plurality of rigid members. For example, a first weight-balance fixation position may be located at a first location relative to either or both of the distal end and the proximal end of the rigid member and a second weight-balance fixation position may be located at a second location relative to either or both of the distal end and the proximal end of the rigid member. Each rigid member of the first plurality of rigid members may be associated with a repositionable weight. For example, the repositionable weight may be disposed at a point along the rigid member (e.g., inside the rigid member). One or more actuators may be used to remove a repositionable weight from and/or secure a repositionable weight at any predetermined weight-balance fixation positions of the plurality of predetermined weight-balance fixation positions. For example, each rigid member of the first plurality of rigid members may contain therein, a cord to which the repositionable weight is attached. The cord may comprise a proximal end and a distal end or may comprise a closed loop. The cord may be communicatively coupled to the one or more actuators such that when the one or more actuators actuates or is caused to actuate, the cord is transposed along a length of the rigid member, thereby repositioning the repositionable weight from, for example, the first weight-balance fixation position to the second weight-balance fixation position.

The apparatus may comprise a second plurality of rigid members. Each rigid member of the first plurality of rigid members may be connected, via a respective hinge element (e.g., a revolute joint, a universal joint, a spherical joint, etc.), to a rigid member of the second plurality of rigid members (e.g., booms, etc.). For example, each rigid member of the second plurality of rigid members may include a proximal end that is rotatably and pivotally coupled to a distal end of a rigid member of the first plurality of rigid members. For example, a proximal end of each rigid member of the second plurality of rigid members may be rotatably and pivotally coupled to the distal end of a rigid member of the first plurality of rigid members. A distal end of each rigid member of the second plurality of rigid members may be rotatably and pivotally coupled to a gripping element.

Each rigid member of the second plurality of rigid members may comprise a plurality of predetermined weight-balance fixation positions. The weight-balance fixation positions may be evenly and/or incrementally spaced along the internal body of each rigid member of the second plurality of rigid members. For example, a third weight-balance fixation position may be located at a third location relative to either or both of the distal end and the proximal end of the rigid member and a fourth weight-balance fixation position may be located at a second location relative to either or both of the distal end and the proximal end of the rigid member. Each rigid member of the second plurality of rigid members may be associated with a repositionable weight. For example, the repositionable weight may be disposed at a point along the rigid member (e.g., inside the rigid member). One or more actuators may be used to remove a repositionable weight from and/or secure a repositionable weight at any predetermined weight-balance fixation positions of the plurality of predetermined weight-balance fixation positions. For example, each rigid member of the second plurality of rigid members may contain therein, a cord to which the repositionable weight is attached. The cord may comprise a proximal end and a distal end or may comprise a closed loop. The cord may be communicatively coupled to the one or more actuators such that when the one or more actuators actuates or is caused to actuate, the cord is transposed along a length of the rigid member, thereby repositioning the repositionable weight from, for example, the third weight-balance fixation position to the fourth weight-balance fixation position.

The apparatus may include a gripper element that may be used to grip, grasp and/or otherwise handle or manipulate an object. For example, the gripper element may include a plurality of gripper members that are each coupled to one or more actuators for actuating movement of the gripper members. For example, each gripper member of the plurality of gripper members may be coupled to a distal end of a rigid member of the second plurality of rigid members by a joint with an actuator coupled to the joint. Each gripper member of the plurality of gripper members may be associated with one or more gripper element sensors (e.g., a tactile/pressure sensor, a proximity sensor, an imaging sensor, a photoelectric sensor, etc.). The one or more sensors may be used to detect objects within proximity to the gripper, such as a microplate, and enable precision when controlling of the gripper element.

The apparatus may comprise one or more flight sensors. The one or more flight sensors may comprise at least one of: an altimeter, an airspeed sensor, a ground speed sensor, an air pressure sensor, an accelerometer, a compass, a roll sensor, a pitch sensor, a yaw sensor, combinations thereof, and the like. The one or more sensors may be configured to determine and communicate (e.g., transmit signals related to) flight information to, for example, at least one of a control unit and/or a control module.

The apparatus may comprise one or more kinematic sensors. The one or more kinematic sensors may be configured to determine forces acting on one or more of the various components of the apparatus as described herein. For example, the one or more kinematic sensors may comprise at least one of a spring, a capacitor, or any other sensor configured to determine stress, strain, or other kinematic or mechanical forces. The one or more kinematic sensors may be located proximate any of the components described herein. For example, a first kinematic sensor may be configured to determine a tensile force acting on a first hinge element induced by, for example, an acceleration of a payload gripped by the gripping element. For example, in the case that the payload comprises a test tube or microplate, an outside force such as a breeze may act on the payload and cause the acceleration of the payload in a first direction. In order to maintain the center of mass of the apparatus (including the payload), the one or more repositionable weights may be repositioned. For example, a breeze may cause the microplate to accelerate in a negative x direction (a person of skill in the art will appreciate that the directions referred to herein, much like "up," or "down," "left" or "right," are arbitrary and any direction may be accounted for). The acceleration in the microplate may cause a force to be measured in the first kinematic sensor of the one or more kinematic sensors (e.g., the acceleration in the microplate may cause a strain or tension to be measured by the kinematic sensor).

Inverse kinematic is calculated using the desired goal position, the strain or tension measured by the kinematic sensor. This calculation provides the desired input to the control unit of each actuator so as to offset the acceleration (and accompanying displacement) of the microplate in space and maintain the center of mass and/or center of gravity of the apparatus and payload. Based on the strain or tension measured by the kinematic sensor, the control unit may determine a repositioning of the one or more repositionable weights so as to offset the acceleration (and accompanying displacement) of the microplate in space and maintain the center of mass and/or center of gravity of the apparatus and payload. For example, the control unit may cause an activation of an actuator which in turn may cause a translational movement of the cord within a rigid member, thereby repositioning, from a first predetermined weight-fixation position, a first repositionable weight to a second predetermined weight-fixation position. While a single, first, kinematic sensor is mentioned, a person of skill in the art will appreciate that any number of kinematic sensors may be involved in the systems and methods described herein. For example, the first kinematic sensor may be associated with a first hinge element and a second kinematic sensor may be associated with a second hinge element.

Similarly, an outside force may act on the UAV (e.g., on the body of the UAV, or any other component), which may cause an acceleration in the UAV (e.g., a disturbance in a flight path) and corresponding movement of the payload. In a similar manner as described above, a force, acceleration, and/or displace of either or both of the UAV and/or the payload may be determined. Based on determining the movement of the UAV and/or the payload, the control unit may cause one or more repositionable weights of the one or more repositionable weights to move from a first predetermined weight-fixation position to a predetermined weight-fixation position, thereby offsetting a change in the center of mass and/or the center of gravity associated with the movement of the payload or UAV relative to each other.

The control unit may be communicatively coupled to each actuator and/or sensor of the apparatus. The control unit may include a wireless transceiver for sending and receiving control signals used to manage the operation and control of the sensors and actuators. For example, the control unit, may receive from at least one sensor of the one or more flight sensors, and/or at least one sensor of the one or more kinematics sensors, and/or at least on sensor of the one or more gripper element sensors. The control unit may communicate with the control module of and/or associated with a UAV. The control unit may communicate information with the UAV, such as orientation information, weight/payload information, sensor relating information, telemetry data, and/or the like that may be used to set, modify, and/or update a flight plan and/or in-flight operation of the UAV. For example, the control unit may receive data/information from an accelerometer and/or gyroscope, such as orientation information, that may be sent to the control module of the UAV to enable flight stabilization and/or weight/load balancing/adjustment. For example, Additionally, equally spaced positioning of rigid members and centralized positioning of the movable gripper element of the apparatus reduces the impact on a center of gravity associated with the attached UAV.

FIG. 1 shows a system 100. The system 100 may comprise a user device 101, a UAV 102, a network 110, and one or more remote computing devices 112A and 112B. The one or more remote computing devices 112A and 112B may comprise any type of computing device. For example, the remote computing device 112A may comprise a location server such as a global positioning system (GPS) server, a National Weather Service (NWS) server, a maps service server, combinations thereof, and the like. For example, the remote computing device 112B may comprise an HTS program server. For example, the HTS program server may be configured to coordinate one or more flight paths of one or more UAVs, including the UAV 102. For example, the HTS server may coordinate the one or more flight paths of the one or more UAVs so as to avoid collision among and/or between the one or more UAVs. The network 110 may be configured to facilitate sending and/or receiving data, information, signals, and the like, to and from the components of the system 100. The network 110 may be a wireless network, a satellite system, an optical fiber network, a coaxial cable network, a hybrid fiber-coaxial network, a direct broadcast system, or any combination thereof. The network 105 can be the Internet.

The user device 101 (e.g., a computing device, a smart device, a mobile device, etc.) may be configured to control one or more component of an UAV. For example, the user device 101 may be configured to determine and/or communicate to the UAV, one or more flight paths. The one or more flights paths may comprise flight directions and/or flight information such as a designated path between one or more points. For example, in an HTS setting, a flight path of the one or more flight paths may comprise a flight path between two pieces of equipment starting at a first piece of equipment of the two pieces of equipment and ending at the second piece of equipment of the two pieces of equipment. Of course the flight path may include any number of locations and/or stops along the flight path. The user device 101 may be configured to send one or more flight instructions to the UAV 102. The one or more flight instructions may include flight information such as altitude, speed, direction, combinations thereof, and the like. The flight information may also include apparatus specifications. For example, the apparatus specifications may include one or more of: a mass and one or more dimensions (e.g., height, width, length, volume) associated with the UAV 102, a mass and one or more dimensions (e.g., height, width, length, volume) associated with the apparatus, a mass and one or more dimensions (e.g., height, width, length, volume) associated with the payload. For example, the mass and one or more dimensions associated with apparatus may comprise, for example, a mass, a length, and a volume associated with each rigid member of the first plurality of rigid members, a mass, a length, and a volume associated with each rigid member of the second plurality of rigid members, a mass and radius associated with each hinge element, a mass and one or more dimensions associated with the base member, a mass and one or more dimensions associated with the gripper element, a mass associated with each repositionable weight of the one or more repositionable weights, a distance between one or more of the predetermined weight-fixation positions, combinations thereof, and the like.

The user device 101 may be in communication with an unmanned aerial vehicle (UAV) 102 of the one or more unmanned aerial vehicles and a manipulator 130 (e.g., three-axis parallel manipulator and gripper, etc.). The user device 101 may be configured to control an object manipulator and payload management system for one or more unmanned aerial vehicles (UAVs). For example, the UAV 101, may be used, for example, in a high-throughput screening (HTS) laboratory to replace stationary robotic arms with limited mobility. The UAV 102 may perform manual, semi-autonomous, and/or fully autonomous flights/missions (e.g., along the one or more flight paths) to transport one or more payloads (e.g., microplates) and/or any other object. In some instances, the system 100 may include a plurality of UAVs 102. The manipulator 130 may be geometrically shaped and configured with one or more attachment elements that enable the manipulator 130 to be securely attached to the body, for example, the underbody, of the UAV 102. For example, the user device may be configured to determine one or more apparatus settings. For example, the one or more apparatus settings may comprise stability settings (e.g., stability of the payload). For example, the apparatus may receive an instruction to maintain a position of the payload or adjust the position of the payload based on, for example, a determined external force (e.g., a torque) which may affect the momentum of the manipulator 130 and/or UAV 102, as described in further detail below.

The user device 101 may include a bus 104, a processor 105, memory 106, an interface module 107, a display 108, a communication module 108. In some embodiments, the user device 101 may omit at least one of the aforementioned constitutional elements or may additionally include other constitutional elements. The bus 104 may include a circuit for connecting the constitutional elements of the user device 101 to each other and for delivering communication (e.g., a control message and/or data) between the constitutional elements.

The processor 105 may include one or more of a Central Processing Unit (CPU), an Application Processor (AP), and a Communication Processor (CP), and/or the like. The processor 105 may control, for example, at least one of other constitutional elements of the user device 101. The processor 105 may include processor executable instructions that, when executed, cause the user device 101 to perform any or all of the methods and/or steps described herein, such as control (via one or more control signals, etc.) the UAV 102 and/or the manipulator 130.

The interface module 107 my include one or more interfaces such as a keyboard, a pointing device (e.g., a computer mouse, remote control), an audio device (e.g., a speaker, a microphone, etc.), a camera, a joystick, a scanner, haptic sensing and/or tactile input devices, and/or the like. The interface module 107 may include one or more displays (e.g., Liquid Crystal Display (LCD) displays, Light Emitting Diode (LED) displays, Organic Light-Emitting Diode (OLED) displays, MicroElectroMechanical Systems (MEMS), touchscreen displays, etc.) for displaying/presenting information to a user, such as information associated movement and/or manipulation of the manipulator 130 and/or UAV 102.

The interface module 107 may include, be associated with, and/or be in communication with a graphical user interface (GUI), a web browser (e.g., Internet Explorer®, Mozilla Firefox®, Google Chrome®, Safari®, or the like), an application/API. The interface module 107 may request and/or query various files from a local source such as the memory 106 and/or a remote source, such as the UAV 102 and/or the manipulator 130.

The communication module 108 may establish, for example, communication between the user device 101 and any other device/component of the system 100, such as the manipulator 130 and/or the UAV 102. The communication module 108 may utilize any suitable wired communication technique, such as Ethernet, coaxial cable, fiber optics, and/or the like. The communication module 108 may utilize any suitable long-range communication technique, such as Wi-Fi (IEEE 802.11), BLUETOOTH®, cellular, satellite, infrared, and/or the like. The communication module 108 may utilize any suitable short-range communication technique, such as BLUETOOTH®, near-field communication, infrared, and the like.

The memory 106 may include a volatile and/or non-volatile memory. The memory 106 may store, for example, a command and/or data related to at least one different constitutional element of the user device 101. The memory 106 may store software, such as an application and/or a program 120. The program 120 may be configured for manipulator, gripper, and/or UAV control and/or analysis. The program 120 may include, for example, a kernel 121, middleware 122, an Application Programming Interface (API) 123, an Unmanned Aerial Vehicle (UAV) management and control program 124, a manipulator control module 125, and/or the like.

At least one part of the kernel 121, middleware 122, or API 123 may be referred to as an Operating System (OS). The memory 106 may include a computer-readable recording medium having a program recorded therein to perform the method according to various embodiments by the processor 105.

The kernel 121 may control or manage, for example, system resources (e.g., the bus 104, the processor 105, the memory 106, etc.) used to execute an operation or function implemented in other programs (e.g., the API 123, the UAS management and control program 124, the manipulator control module 125, etc.). Further, the kernel 121 may provide an interface capable of controlling or managing the system resources by accessing individual constitutional elements of the user device 101 in the middleware 122, the API 123, the UAV management and control program 124, and/or the manipulator control module 125.

The middleware 122 may perform, for example, a mediation role so that the API 145, the UAV management and control program 124, and/or the manipulator control module 125 may communicate with the kernel 121 to exchange data.

Further, the middleware 122 may handle one or more task requests received from the API 123, the UAV management and control program 124, and/or the manipulator control module 125 according to a priority. For example, the middleware 122 may assign a priority of using the system resources (e.g., the bus 104, the processor 105, or the memory 106) of the user device 101 to the UAV management and control program 124, and/or the manipulator control module 125. For instance, the middleware 122 may process the one or more task requests according to the priority assigned to the UAV management and control program 124, and/or the manipulator control module 125, and thus may perform scheduling or load balancing on the one or more task requests.

The API 123 may include at least one interface or function (e.g., instruction, etc.), for example, for file control, window control, video processing, or character control, as an interface (e.g., the interface module 107, etc.) capable of controlling a function provided by the UAV management and control program 124 and/or the manipulator control module 125 in the kernel 121 or the middleware 122. For example, the interface module 107 may play a role of an interface for delivering an instruction or data input from a user or a different external device(s) to the different constitutional elements of the user device 101. Further, the interface module 107 may output an instruction or data received from the different constitutional element(s) of the user device 101 to the different external device.

The user device 101 may be used to control and/or operate the UAV 102 and/or the manipulator 130. For example, the manipulator control module 125 may be used to control one or more actuators configured with the manipulator 130. The user device 101 (the manipulator control module 125) may be used to control one or more actuators configured with the manipulator 130 based on one or more signals received from one or more sensors (e.g., tactile/pressure sensors, proximity sensors, imaging sensors, photoelectric sensors, etc.), such as one or more Time of Flight distance sensors. For example, the manipulator 130 may be configured with a gripper element (not shown) that may be used to grasp and/or manipulate an object, such as a microplate and/or any other object. The gripper element may include a plurality of gripper members that are each coupled to one or more actuators for actuating movement of the gripper members. Each gripper member of the plurality of gripper members may be associated with a sensor (e.g., a tactile/pressure sensor, a proximity sensor, an imaging sensor, a photoelectric sensor, etc.). The sensors may be used to detect objects within proximity to the gripper, such as a microplate, and enable precision when controlling of the gripper element.

In some instances, a control unit 131 may be communicatively coupled to each actuator and/or sensor of the gripper element configured with the manipulator 130. The control unit may include a wireless transceiver for sending and receiving control signals used to manage the operation and control of the sensors and actuators.

The control unit 131 may communicate with the user device 101 and/or the UAV 102 (e.g., a control module of the UAV 102, etc.). The control unit 131 may communicate information to/from the UAV 102 and/or user device 101, such as orientation information, weight/payload information, sensor relating information, telemetry data, and/or the like that may be used to set, modify, and/or update a flight plan and/or in-flight operation of the UAV 102. For example, the control unit 131 may receive data/information from an accelerometer, gyroscope, and/or the like (not shown) configured with the manipulator 130, such as orientation information, that may be sent to the UAV 102 and/or user device 101 to enable flight stabilization and/or weight/load balancing/adjustment. As described further below, the control unit 131 may receive or otherwise determine one or more of: a mass and one or more dimensions (e.g., height, width, length, volume) associated with the UAV 102, a mass and one or more dimensions (e.g., height, width, length, volume) associated with the apparatus, a mass and one or more dimensions (e.g., height, width, length, volume) associated with the payload. For example, the mass and one or more dimensions associated with apparatus may comprise, for example, a mass, a length, and a volume associated with each rigid member of the first plurality of rigid members, a mass, a length, and a volume associated with each rigid member of the second plurality of rigid members, a mass and radius associated with each hinge element, a mass and one or more dimensions associated with the base member, a mass and one or more dimensions associated with the gripper element, a mass associated with each repositionable weight of the one or more repositionable weights, a distance between one or more of the predetermined weight-fixation positions, combinations thereof, and the like.

The control unit 131 may, based on the one or more sensors and the above masses and one or more dimensions, receive or otherwise determine an external force acting on the UAV 102 (e.g., on either the drone itself and/or on the manipulator 130). For example, the control unit 131 may receive, from the one or more kinematic sensors, and indication of a force acting on the manipulator 130. For example, the control unit 131 may determine a torque. Based on the torque, the control unit 131 may determine a repositioning of at least one repositionable weight of the one or more repositionable weights. For example, based on the torque, the control unit 131 may determine a change in a center of mass and/or a change in a center of gravity associated with the UAV and reposition the at least one repositionable weight of the one or more repositionable weights so as to offset (e.g., counterbalance) the torque and thereby maintain a flight path.

Figure 2:
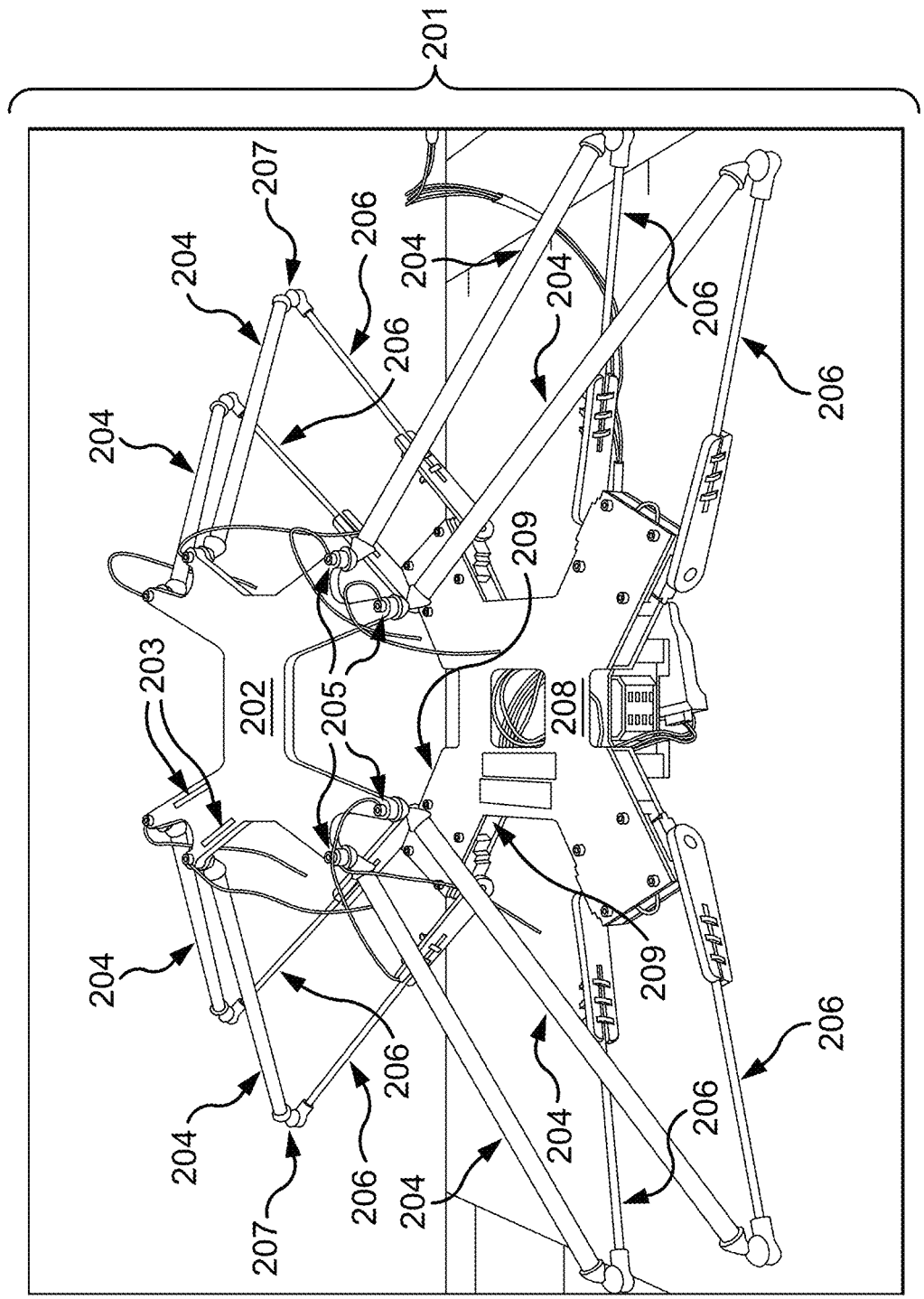
FIG. 2 shows an example object manipulator.

FIG. 2 is an example of a three-axis parallel manipulator and gripper (PMG) 201. In an embodiment, the PMG 201 may include a configuration of and/or related to a 6-RUS parallel manipulator with six degrees of freedom. The PMG 201 may be constructed from light weight material and include a total weight between 0 grams and 682 grams. The PMG 201 may include a base member 202. The base member 202 may be configured to attach to a body of a UAV. For example, the base member 202 may include a geometry that is compatible with UAVs manufactured by companies such as DJI, Kespry, Parrot, Yuneec, and/or the like. The base member 202 may include any suitable geometry. The base member 202 may include one or more attachment elements 203 configured on a face of the base member 202. For example, the one or more attachment elements 203 may include adhesives, clamps, fitted portions, notches, indentations, grooves, and/or the like. Although only two attachment elements 203 are show, the base member 202 may include any number of attachment elements 203.

The PMG 201 may include a first plurality of rigid members 204 (e.g., booms, etc.). For example, the PMG 201 may include eight rigid members 204 that extend from edges (e.g., evenly spaced edges, etc.) of the base member 202. A proximal end of each rigid member 204 may be rotatably and/or pivotally coupled to the base member 202. For example, the proximal end of each rigid member 204 may be rotatably and/or pivotally coupled to the base member 202 via a respective hinge element 205. The hinge element 205 may be, for example, a revolute joint, a universal joint, a spherical joint, and/or the like. The rigid members 204 may include and/or be constructed from a sturdy, rigid material, such as carbon fiber and/or the like.

To enable a UAV attached to the PMG 201 to maintain an upright position and/or to counter balance the weight of any object, such as a microplate, picked up and/or manipulated by the PMG 201, the PMG 201 may employ a weight balance system. For example, each rigid member 204 may include a plurality of predetermined weight-balance fixation positions and a repositionable weight.

Figure 3A:
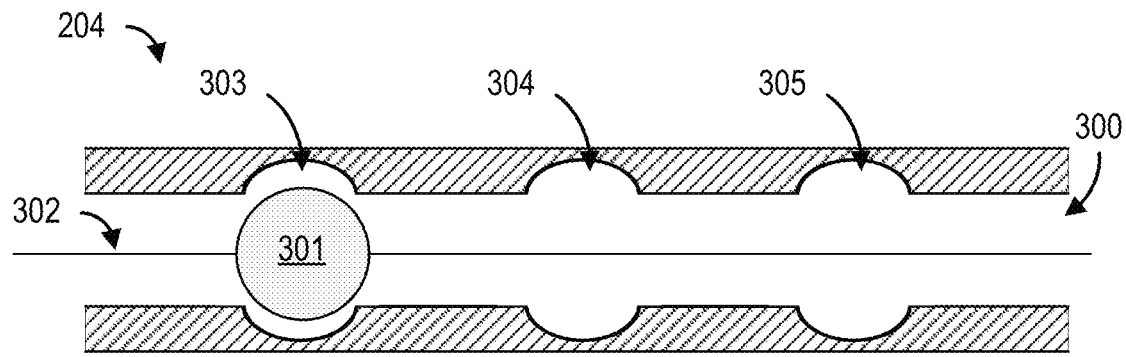
FIGS. 3A-3C shows a rigid member of an example object manipulator.
Figure 3B:
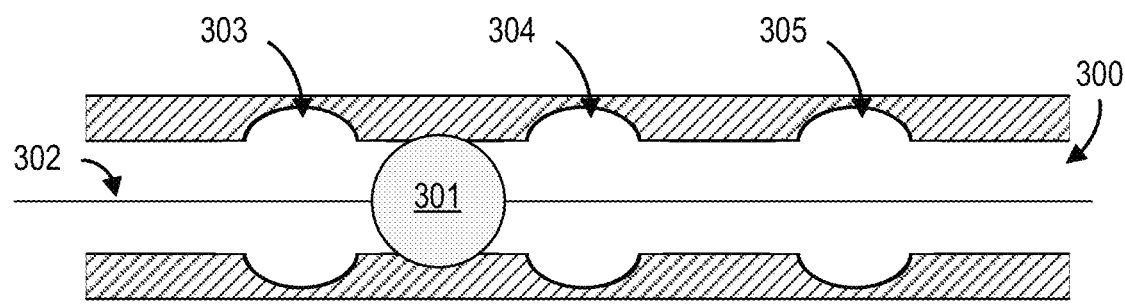
Figure 3C:
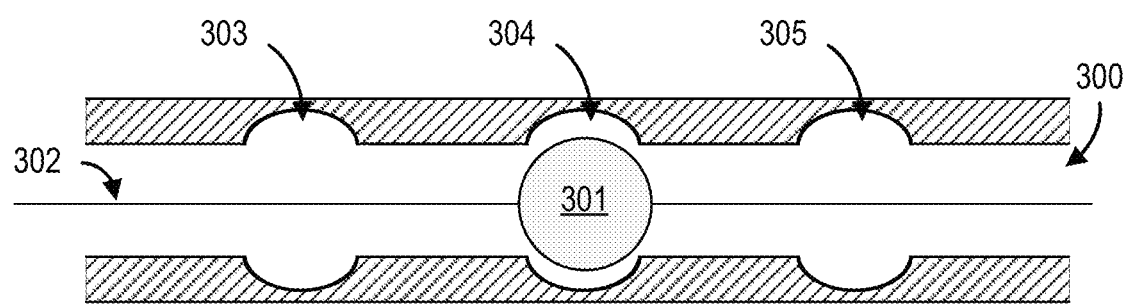

FIGS. 3A-3C show cross sections of a portion of an example rigid member 204. Each rigid member 204 may include a hollow area 300 that houses a repositionable weight 301. The repositionable weight 301 may be attached at a fixed position to a cord 302. An end of the cord 302 may be attached to an actuator (not shown), such as a servo motor, stepper motor, and/or the like at either or both ends of the cord 302. For example, FIG. 3A shows repositionable weight 301 at a first predetermined weight-fixation position 303 of a plurality of predetermined weight-fixation positions 303-305. Each rigid member of the first plurality of rigid members may comprise a plurality of predetermined weight-balance fixation positions. The weight-balance fixation positions may be evenly and/or incrementally spaced along the internal body of each rigid member of the first plurality of rigid members. For example, the first weight-balance fixation position 303 may be located at a first location relative to either or both of the distal end and the proximal end of the rigid member and a second weight-balance fixation position 304 may be located at a second location relative to either or both of the distal end and the proximal end of the rigid member. Each rigid member of the first plurality of rigid members may be associated with a repositionable weight. For example, the repositionable weight may be disposed at a point along the rigid member (e.g., inside the rigid member). One or more actuators may be used to remove a repositionable weight from and/or secure a repositionable weight at any predetermined weight-balance fixation positions of the plurality of predetermined weight-balance fixation positions. For example, each rigid member of the first plurality of rigid members may contain therein, a cord to which the repositionable weight is attached. The cord may comprise a proximal end and a distal end or may comprise a closed loop. The cord may be communicatively coupled to the one or more actuators such that when the one or more actuators actuates or is caused to actuate, the cord is transposed along a length of the rigid member, thereby repositioning the repositionable weight from, for example, the first weight-balance fixation 303 position to the second weight-balance fixation position 304 (as seen in FIG. 3B and FIG. 3C).

The PMG 201 may include a controller (e.g., the control unit 131, etc.) that, for example, based on one or more control signals, may control the operation of the actuator. The controller may actuate the actuator to cause the cord 302 to move in either direction along the horizontal axis of the rigid member 204 (e.g., within the hollow area 300). The cord 302 moving in either direction along the horizontal axis of the rigid member 204 (e.g., the hollow area 300) may cause the repositionable weight to be removed from and/or secured at any one of the predetermined weight-balance fixation positions 303. For example, returning to FIG. 1, the control unit 131 may communicate with the user device 101. The control unit 131 may communicate information associated with the manipulator 130 (e.g., the PMG 201) with the UAV 302, such as orientation information, weight/payload information, sensor relating information, telemetry data, and/or the like that may be used to set, modify, and/or update a flight plan and/or in-flight operation of the UAV 302. The control unit 131 may receive data/information from an accelerometer and/or gyroscope configured with the manipulator 130 (e.g., the PMG 201) and/or the UAV 302, such as orientation information, that may be sent to the user device 101 and/or the UAV 302 to enable flight stabilization and/or weight/load balancing/adjustment.

The apparatus may comprise one or more flight sensors. The one or more flight sensors may comprise at least one of: an altimeter, an airspeed sensor, a ground speed sensor, an air pressure sensor, an accelerometer, a compass, a roll sensor, a pitch sensor, a yaw sensor, combinations thereof, and the like. The one or more sensors may be configured to determine and communicate (e.g., transmit signals related to) flight information to, for example, at least one of a control unit and/or a control module.

The apparatus may comprise one or more kinematic sensors. The one or more kinematic sensors may be configured to determine forces acting on one or more of the various components of the apparatus as described herein. For example, the one or more kinematic sensors may comprise at least one of a spring, a capacitor, or any other sensor configured to determine stress, strain, or other kinematic or mechanical forces. The one or more kinematic sensors may be located proximate any of the components described herein. For example, a first kinematic sensor may be configured to determine a tensile force acting on a first hinge element induced by, for example, an acceleration of a payload gripped by the gripping element. For example, in the case that the payload comprises a test tube or microplate, an outside force such as a breeze may act on the payload and cause the acceleration of the payload in a first direction. In order to maintain the center of mass of the apparatus (including the payload), the one or more repositionable weights may be repositioned. For example, a breeze may cause the microplate to accelerate in a negative x direction (a person of skill in the art will appreciate that the directions referred to herein, much like "up," or "down," "left" or "right," are arbitrary and any direction may be accounted for). The acceleration in the microplate may cause a force to be measured in the first kinematic sensor of the one or more kinematic sensors (e.g., the acceleration in the microplate may cause a strain or tension to be measured by the kinematic sensor).

Similarly, an outside force may act on the UAV (e.g., on the body of the UAV, or any other component), which may cause an acceleration in the UAV (e.g., a disturbance in a flight path) and corresponding movement of the payload. In a similar manner as described above, a force, acceleration, and/or displace of either or both of the UAV and/or the payload may be determined. Based on determining the movement of the UAV and/or the payload, the control unit may cause one or more repositionable weights of the one or more repositionable weights to move from a first predetermined weight-fixation position to a predetermined weight-fixation position, thereby offsetting a change in the center of mass and/or the center of gravity associated with the movement of the payload or UAV relative to each other.

For example, the manipulator 130 (the PMG 201) may be attached to the UAV 302 and the UAV 302 may fly over an object, such as a microplate. The user device 101 may send one or more control signals to the manipulator 130 (the PMG 201) that causes the manipulator 130 (the PMG 201) to maneuver over the object and pick the object up, for example, with a gripper element (the gripper element 208). The weight of the object may disorient the UAV 302, for example, from an upright flight position—which, if unmitigated, could cause the UAV 302 to crash. To mitigate the disorientation, the accelerometer and/or gyroscope configured with the manipulator 130 (e.g., the PMG 201) and/or the UAV 302 may send one or more signals indicative of the disorientation to the control unit 131. The control unit 131, based on the one or more signals indicative of the disorientation, may send one or more signals to the actuator connected to the cord 302 of FIG. 3. Returning to FIG. 3, the actuator may cause the repositionable weight 301 to be removed from and/or secured at any one of the predetermined weight-balance fixation positions 303 based on which ever predetermined weight-balance fixation position 303 serves best to counterbalance the weight of the object. The control unit 131 and/or the user device 101 may be configured to use any algorithm and/or method to determine the predetermined weight-balance fixation position 303 of each rigid member 204 that best serves to counterbalance the weight of the object. For example, based on a strain or a tension measured by a kinematic sensor, the control unit may determine a repositioning of the one or more repositionable weights so as to offset (e.g., counterbalance) the acceleration (and accompanying displacement and change in the center of gravity and/or the center of mass) of the microplate in space and maintain the center of mass and/or center of gravity of the apparatus and payload. Inverse kinematic is calculated using the desired goal position, the strain or tension measured by the kinematic sensor. This calculation provides the desired input to the control unit of each actuator so as to offset the acceleration (and accompanying displacement) of the microplate in space and maintain the center of mass and/or center of gravity of the apparatus and payload. For example, the control unit may cause an activation of an actuator which in turn may cause a translational movement of the cord within a rigid member, thereby repositioning, from a first predetermined weight-fixation position, a first repositionable weight to a second predetermined weight-fixation position. While a single, first, kinematic sensor is mentioned, a person of skill in the art will appreciate that any number of kinematic sensors may be involved in the systems and methods described herein. For example, the first kinematic sensor may be associated with a first hinge element and a second kinematic sensor may be associated with a second hinge element.

Returning to FIG. 2, the PMG 201 may include a second plurality of rigid members 206 (e.g., booms, etc.). Each rigid member 206 may include a proximal end that is rotatably and pivotally coupled to a distal end of a rigid member 204. For example, the proximal end of each rigid member 206 may be rotatably and/or pivotally coupled to a distal end of a rigid member 204 via a respective hinge element 207. The hinge element 207 may be, for example, a revolute joint, a universal joint, a spherical joint, and/or the like. The rigid members 206 may include and/or be constructed from a sturdy, rigid material, such as carbon fiber and/or the like.

The rigid members 206 may each include a hollow area that houses at least a portion of a cord (the cord 302) connected to an actuator.

Figure 4:
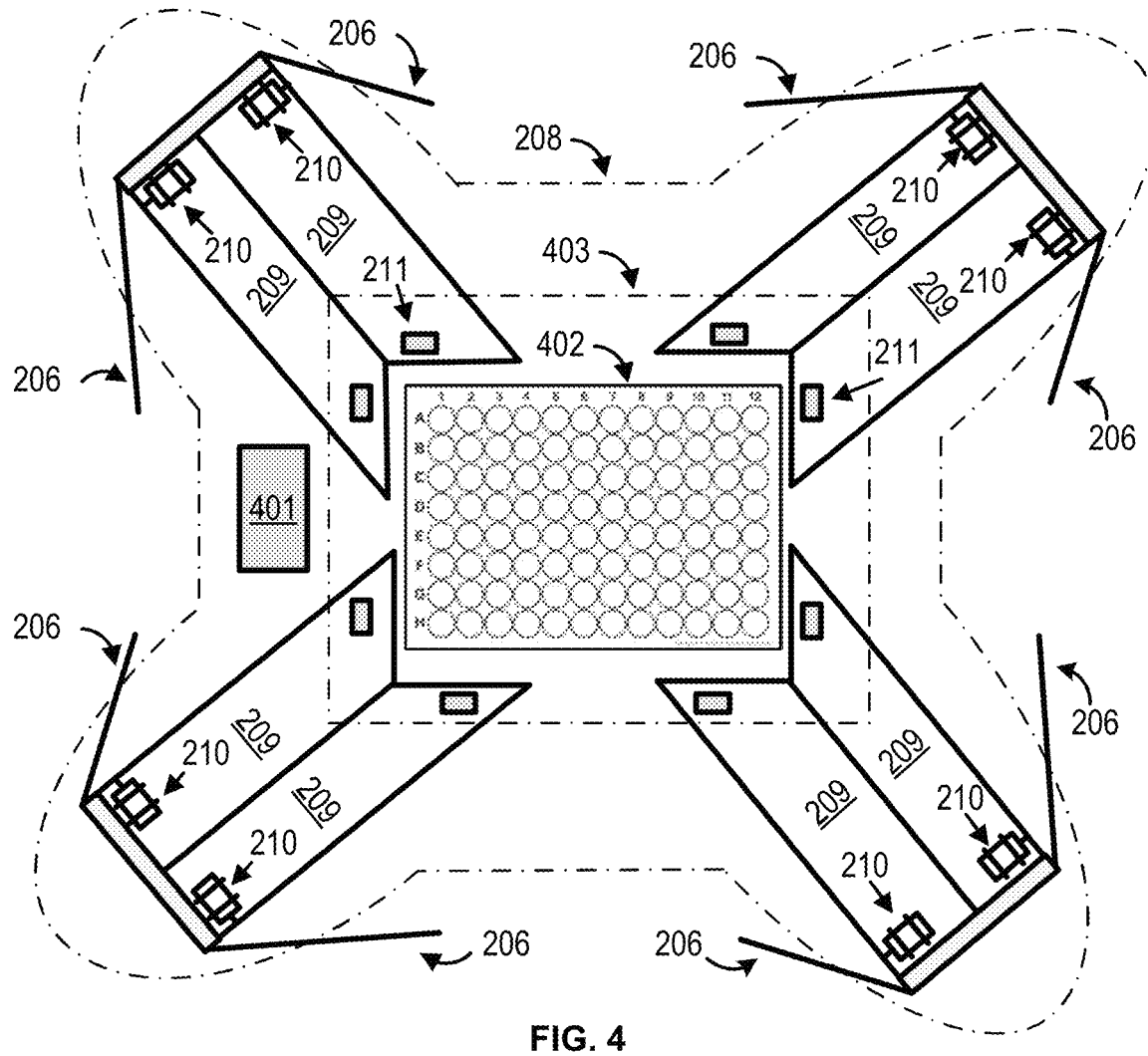
FIG. 4 shows a gripper element of an example object manipulator.

The PMG 201 may include a gripper element 208. The gripper element 208 may include a plurality of gripper members 209. A gripper member 209 may be attached to the distal end of each rigid member 206. FIG. 4 shows an example internal view of the gripper element 208. Each gripper member 209 may be coupled to a distal end of a rigid member 206 of the second plurality of rigid members by a joint (not shown). Each of the joints may be coupled to a different actuator 210. The actuator 210, when actuated, may cause the gripper member 209 to move and/or translate in either direction along a horizontal plane relative to the gripper member 209. The gripper member 209 to move and/or translate in either direction along a horizontal plane relative to the gripper member 209. When moved/translated along its relative horizontal plane, each gripper member 209 may be either positioned away from or towards and object 402 positioned in an opening 403 of the gripper element 208. For example, the object 402 may be a microplate. In an embodiment, each gripper member 209 may include a substantially rectangular shape with the distal end of each gripper member 209 cut at an angle, such as a forty-five degree angle. Each gripper member 209 may be positioned and/or oriented next to another gripper member 209 such that, when aligned, the distal ends of the gripper members 209 for a ninety degree angle. In some embodiments, each gripper member 209 may include any other shape and/or orientation.

As each gripper member 209 moves/translates along its relative horizontal plane towards the object 402 positioned in the opening 403, the distal ends of the gripper members 209 may for a shape that that complements a shape (e.g., a rectangular shape, a square shape, etc.) of the object 403. Each actuator 210 may be individually controlled based on one or more control signals received from a control unit 401 (e.g., a controller, the control unit 131, etc.) communication between the control unit 401 and the actuators 210 may include wired and/or wireless communication. In some instances, the control unit 401 may receive control signals from the user device 101 of FIG. 1.

The gripper element 208 may include a plurality of sensors 211 (e.g., tactile/pressure sensors, proximity sensors, imaging sensors, photoelectric sensors, etc.), such as one or more Time of Flight distance sensors. For example, each gripper member 209 may include a sensor 211 configured at and/or within proximity to the distal end of the gripper member 209. The sensor 211 may detect and/or determine when the gripper member 209 is within proximity to and/or contact with the object 402 and send the data/information to the control unit 401. The control unit 401 may use the data/information from the sensors 211 to cause and/or prevent one or more of the actuators 210 from moving/translating a gripper member 209 along a relative horizontal plane.

Figure 5A:
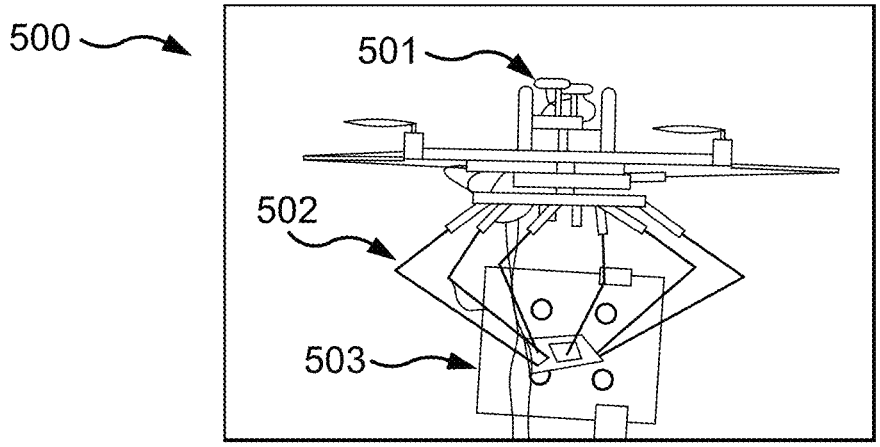
FIGS. 5A-5C shows an example maneuver.
Figure 5B:
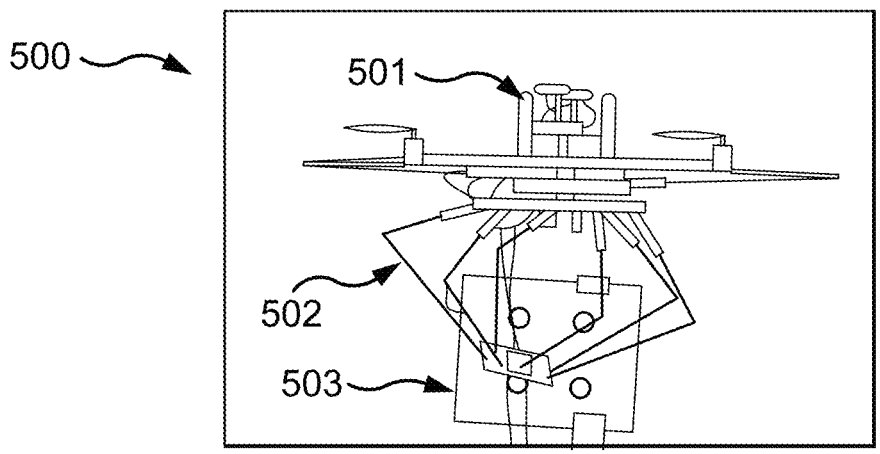
Figure 5C:
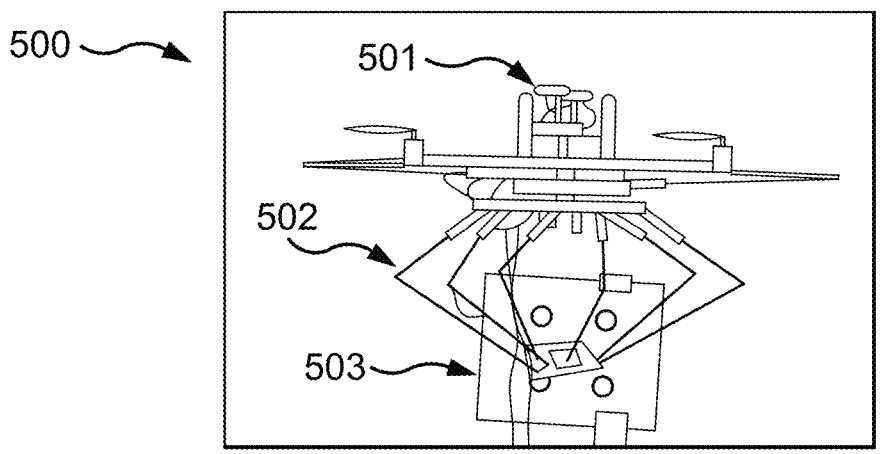

FIGS. 5A-5C show an example maneuver undertaken by the apparatus. FIG. 5A shows a system 500 (e.g., a UAV 501, a parallel manipulator gripper (PMG) 502, and a payload 503) in an initial state. In FIG. 5A, the payload 503 is suspended (and gripped) by the PMG virtually directly below the UAV 501. As such, when the UAV is stable, the one or more hinge elements are configured such that each hinge element of the one or more hinge elements has approximately the same angle and thus, the UAV 501, the PMG 502, and the payload 503 are in approximate equilibrium.

FIG. 5B shows the influence of an external force such as a breeze acting on the payload 503 such that the entire system (e.g., the UAV 501, the PMG 502, and the payload 503) are under the influence of a torque. As such, at least one hinge element of the one or more hinge elements may be configured to maintain a center of mass. Additionally or alternatively, at least one repositionable weight of the one or more repositionable weights may be repositioned along the length of a rigid member so as to maintain the center of gravity, thereby reducing the influence of the external force and maintaining the momentum of the system so as to maintain a flight pattern.

The control unit 131 may be configured to determine a goal position of the one or more repositionable weights. For example, the goal position may represent a position of the weight which offsets or counterbalances an imbalance of the system imparted, for example, by an external force, or by a shift in a weight (e.g., a mass) associated with the payload. For example, based on a strain or a tension measured by a kinematic sensor, the control unit may determine a repositioning of the one or more repositionable weights so as to offset (e.g., counterbalance) the acceleration (and accompanying displacement and change in the center of gravity and/or the center of mass) of the microplate in space and maintain the center of mass and/or center of gravity of the apparatus and payload. For example, Inverse kinematic is calculated using the desired goal position, the strain or tension measured by the kinematic sensor. This calculation provides the desired input to the control unit of each actuator so as to offset the acceleration (and accompanying displacement) of the microplate in space and maintain the center of mass and/or center of gravity of the apparatus and payload. For example, the control unit may cause an activation of an actuator which in turn may cause a translational movement of the cord within a rigid member, thereby repositioning, from a first predetermined weight-fixation position, a first repositionable weight to a second predetermined weight-fixation position. While a single, first, kinematic sensor is mentioned, a person of skill in the art will appreciate that any number of kinematic sensors may be involved in the systems and methods described herein. For example, the first kinematic sensor may be associated with a first hinge element and a second kinematic sensor may be associated with a second hinge element.

The control unit 131 may be configured to determine one or more goal angles (e.g., "poses") of at least one rigid member of the first plurality of rigid members and/or at least on rigid member of the second plurality of rigid members. For example, the control unit 131 may drive a hinge element in communication with a first rigid member of the first plurality of rigid members and a second rigid member of the second plurality of rigid members. For example, the control unit 131 may determine a goal pose. Given a goal one or more hinge elements FIG. 5C shows the system returning to the initial state.

FIG. 6 shows an example method executing on one or more of the devices or system described herein. At 610, a flight path may be determined. For example, the user device 101 may be configured to determine and/or communicate to the UAV, the flight path. The flight path may comprise flight directions and/or flight information such as a designated path between one or more points. For example, in an HTS setting, the flight may comprise route between two pieces of equipment starting at a first piece of equipment of the two pieces of equipment and ending at the second piece of equipment of the two pieces of equipment. Of course the flight path may include any number of locations and/or stops along the flight path. The user device 101 may be configured to send one or more flight instructions to the UAV 102. The one or more flight instructions may include flight information such as altitude, speed, direction, combinations thereof, and the like. The flight information may also include apparatus specifications. For example, the apparatus specifications may include one or more of: a mass and one or more dimensions (e.g., height, width, length, volume) associated with the UAV 102, a mass and one or more dimensions (e.g., height, width, length, volume) associated with the apparatus, a mass and one or more dimensions (e.g., height, width, length, volume) associated with the payload. For example, the mass and one or more dimensions associated with apparatus may comprise, for example, a mass, a length, and a volume associated with each rigid member of the first plurality of rigid members, a mass, a length, and a volume associated with each rigid member of the second plurality of rigid members, a mass and radius associated with each hinge element, a mass and one or more dimensions associated with the base member, a mass and one or more dimensions associated with the gripper element, a mass associated with each repositionable weight of the one or more repositionable weights, a distance between one or more of the predetermined weight-fixation positions, combinations thereof, and the like. The UAV may comprise a plurality of hinge elements and a plurality of kinematic sensors. The flight path may comprise one or more flight parameters, wherein at least one flight parameter of the one or more flight parameters may be associated with a position of a repositionable weight.

At 620, a force associated with a disruption in the flight path may be determined. For example, a kinematic sensor of the one or more kinematic sensors may be configured to determine one or more forces acting on one or more of the various components of the system (e.g., the UAV, the PMG, and/or the payload) as described herein. For example, the one or more kinematic sensors may comprise at least one of a spring, a capacitor, or any other sensor configured to determine stress, strain, or other kinematic or mechanical forces. The one or more kinematic sensors may be located proximate any of the components described herein. For example, a first kinematic sensor may be configured to determine a tensile force acting on a first hinge element induced by, for example, an acceleration of a payload gripped by the gripping element. For example, in the case that the payload comprises a test tube or microplate, an outside force such as a breeze may act on the payload and cause the acceleration of the payload in a first direction. In order to maintain the center of mass of the apparatus (including the payload), the one or more repositionable weights may be repositioned. For example, a breeze may cause the microplate to accelerate in a negative x direction (a person of skill in the art will appreciate that the directions referred to herein, much like "up," or "down," "left" or "right," are arbitrary and any direction may be accounted for). The acceleration in the microplate may cause a force to be measured in the first kinematic sensor of the one or more kinematic sensors (e.g., the acceleration in the microplate may cause a strain or tension to be measured by the kinematic sensor).

Similarly, an outside force may act on the UAV (e.g., on the body of the UAV, or any other component), which may cause an acceleration in the UAV (e.g., a disturbance in a flight path) and corresponding movement of the payload. In a similar manner as described above, a force, acceleration, and/or displace of either or both of the UAV and/or the payload may be determined.

At 630, a corrective action may be determined. The corrective action may comprise one or more of changing a position of a repositionable weight of the plurality of repositionable weights. Additionally or alternatively, the corrective action may comprise changing an angle associated with at least one hinge element of the plurality of hinge elements. For example, based on determining the force and/or a movement of the UAV and/or the payload, the control unit may cause one or more repositionable weights of the one or more repositionable weights to move from a first predetermined weight-fixation position to a predetermined weight-fixation position, thereby offsetting a change in the center of mass and/or the center of gravity associated with the movement of the payload or UAV relative to each other.

At 640, a signal may be sent. For example, the signal may be sent from the control unit 131 to a hinge element and/or an actuator. For example, the signal may be associated with the corrective action. For example, the signal may be configured to cause at actuator to reposition the repositionable weight. Additionally and/or alternatively, the signal may be configured to cause a change in a angle associated with a hinge element.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. An apparatus comprising:
   a base member comprising one or more attachment elements configured on a face of the base member;
   a first plurality of rigid members extending from evenly spaced edges of the base member, wherein a proximal end of each rigid member of the first plurality of rigid members is rotatably and pivotally coupled to the base member by a respective hinge element, wherein each rigid member of the first plurality of rigid members comprises a respective plurality of predetermined weight-balance fixation positions and a respective repositionable weight configured to be removed from or secured at any one of the respective plurality of predetermined weight-balance fixation positions based on a respective actuator of a first plurality of actuators;
   a second plurality of rigid members, wherein each rigid member of the second plurality of rigid members comprises a proximal end that is rotatably and pivotally coupled to a distal end of a rigid member of the first plurality of rigid members;
   a gripper element, wherein the gripper element comprises a plurality of gripper members and a second plurality of actuators, wherein each gripper member of the plurality of gripper members is coupled to a distal end of a rigid member of the second plurality of rigid members by a joint, and wherein each actuator of the second plurality of actuators is coupled to a joint of a plurality of joints, wherein a first actuator of the first plurality of actuators and a second actuator of the second plurality of actuators are collectively configured to cause a corresponding gripper element to move with six degrees of freedom relative to another gripper member of the plurality of gripper members;
   a plurality of sensors, wherein each sensor of the plurality of sensors is associated with a gripper member of the plurality of gripper members;
   a control unit communicatively coupled to each actuator of the first plurality of actuators, each actuator of the second plurality of actuators, and each sensor of the plurality of sensors; and
   an accelerometer configured to communicate orientation information to the control unit.

2. The apparatus of claim 1, further comprising another plurality of sensors, wherein each sensor of the another plurality of sensors is associated with a predetermined weight-balance fixation position of the plurality of predetermined weight-balance fixation positions, wherein the control unit, based on the another plurality of sensors, is configured to:
   determine when the respective repositionable weight is removed from or secured at any one of the respective plurality of predetermined weight-balance fixation positions; and
   cause, based on determining when the respective repositionable weight is removed from or secured at any one of the respective plurality of predetermined weight-balance fixation positions, an unmanned aerial vehicle (UAV) to adjust one or more flight parameters.

3. The apparatus of claim 1, wherein the base member attaches to an unmanned aerial vehicle (UAV) via the one or more attachment elements.

4. The apparatus of claim 1, wherein the control unit is configured to cause, based on the orientation information, an unmanned aerial vehicle (UAV) to adjust one or more flight parameters.

5. The apparatus of claim 1, wherein the control unit, based on the orientation information, is configured to cause, for one or more rigid members of the first plurality of rigid members, a respective repositionable weight to move from a first predetermined weight-balance fixation position of a respective plurality of predetermined weight-balance fixation positions to a second predetermined weight-balance fixation position of the respective plurality of predetermined weight-balance fixation positions.

6. The apparatus of claim 1, wherein the control unit, based on the orientation information, actuates at least one actuator of the first plurality of actuators, wherein based on an actuation of the at least one actuator a gripper member of the plurality of gripper members moves in a direction relative to another gripper member of the plurality of gripper members.

7. The apparatus of claim 1, wherein one or more of the first plurality of rigid members, or the second plurality of rigid members comprise carbon fiber.

8. The apparatus of claim 1, wherein the first plurality of actuators comprise one or more servo motors, or stepper motors.

9. The apparatus of claim 1, wherein the plurality of sensors comprise one or more of a tactile sensor, a pressure sensor, or a proximity sensor.

10. The apparatus of claim 1, wherein the first plurality of rigid members extending from evenly spaced edges of the base member comprises the first plurality of rigid members extending from the base member at an angle ranging from 0 degrees to 90 degrees relative to the base member.

11. The apparatus of claim 1, wherein the plurality of joints comprises one or more of a collinear joint, orthogonal joint, or a rotational joint.

12. The apparatus of claim 1, wherein the apparatus comprises a weight between 0 grams to 682 grams.

13. An apparatus comprising:
- a base member comprising a plurality of attachment elements configured on a face of the base member;
- a plurality of articulating parallel arms, wherein each articulating parallel arm of the plurality of articulating parallel arms extends from a respective attachment element of the plurality of attachment elements;
- a gripper element, wherein the gripper element comprises a plurality of gripper members, wherein each gripper member of the plurality of gripper members is coupled to a distal end of a articulating parallel arm of the plurality of articulating parallel arms; and
- a plurality of actuators, wherein each actuator of the plurality of actuators causes, in part, a gripper member of the plurality of gripper members to move with six degrees of freedom relative to another gripper member of the plurality of gripper members.

14. The apparatus of claim 13 further comprising:
- a plurality of sensors, wherein each sensor of the plurality of sensors is associated with a gripper member of the plurality of gripper members; and
- a control unit comprising a transceiver and control circuitry, wherein the control unit is communicatively coupled to each actuator of the plurality of actuators and each sensor of the plurality of sensors.

15. The apparatus of claim 14, wherein the control unit, based on the orientation information and the control circuitry, actuates at least one actuator of the plurality of actuators, wherein based on an actuation of the at least one actuator a gripper member of the plurality of gripper members to move in a direction relative to another gripper member of the plurality of gripper members.

16. The apparatus of claim 13, wherein the each articulating parallel arm of the plurality of articulating parallel arms comprises carbon fiber.

17. The apparatus of claim 13, wherein the plurality of actuators comprise one or more servo motors, or stepper motors.

18. The apparatus of claim 13, wherein the base member attaches to an unmanned aerial vehicle (UAV) via the one or more attachment elements.

19. The apparatus of claim 13, wherein the plurality of sensors comprise one or more of a tactile sensor, a pressure sensor, or a proximity sensor.

20. The apparatus of claim 13, wherein the apparatus comprises a weight between 0 grams to 682 grams.

* * * * *